United States Patent
Ananthakrishnan et al.

(10) Patent No.: US 9,074,947 B2
(45) Date of Patent: Jul. 7, 2015

(54) ESTIMATING TEMPERATURE OF A PROCESSOR CORE IN A LOW POWER STATE WITHOUT THERMAL SENSOR INFORMATION

(75) Inventors: Avinash N. Ananthakrishnan, Hillsboro, OR (US); Efraim Rotem, Haifa (IL); Itai Feit, Herzeliya (IL); Tomer Ziv, Rishon Lezion (IL); Doron Rajwan, Rishon le-Zion (IL); Nadav Shulman, Tel Mond (IL); Alon Naveh, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 497 days.

(21) Appl. No.: 13/247,564

(22) Filed: Sep. 28, 2011

(65) Prior Publication Data

US 2013/0080803 A1   Mar. 28, 2013

(51) Int. Cl.
  *G06F 1/32* (2006.01)
  *G01K 7/42* (2006.01)
  *G06F 1/20* (2006.01)

(52) U.S. Cl.
  CPC *G01K 7/42* (2013.01); *G06F 1/206* (2013.01); *G06F 1/3243* (2013.01); *Y02B 60/32* (2013.01); *Y02B 60/1239* (2013.01); *Y02B 60/1275* (2013.01)

(58) Field of Classification Search
  CPC ....... G06F 1/32; G06F 1/3203; G06F 1/3206; G06F 1/3234; G06F 1/3287; G06F 1/3243; G06F 1/206; G01K 7/42; Y02B 60/32; Y02B 60/1239; Y02B 60/1275
  USPC .......................................................... 713/320
  See application file for complete search history.

(56) References Cited

U.S. PATENT DOCUMENTS

| 5,163,153 | A  | 11/1992 | Cole et al.   |
|-----------|----|---------|---------------|
| 5,287,292 | A  | 2/1994  | Kenny et al.  |
| 5,522,087 | A  | 5/1996  | Hsiang        |
| 5,590,341 | A  | 12/1996 | Matter        |
| 5,621,250 | A  | 4/1997  | Kim           |
| 5,931,950 | A  | 8/1999  | Hsu           |
| 6,748,546 | B1 | 6/2004  | Mirov et al.  |

(Continued)

FOREIGN PATENT DOCUMENTS

| CN | 101351759 | 1/2009 |
|----|-----------|--------|
| CN | 101403944 | 4/2009 |

(Continued)

OTHER PUBLICATIONS

U.S. Appl. No. 12/889,121, "Providing Per Core Voltage and Frequency Control," filed Sep. 23, 2010, by Pakaj Kumar.

(Continued)

*Primary Examiner* — Thomas Lee
*Assistant Examiner* — Danny Chan
(74) *Attorney, Agent, or Firm* — Trop, Pruner & Hu, P.C.

(57) ABSTRACT

In one embodiment, the present invention includes a method for determining if a core of a multicore processor is in a low power state, and if so, estimating a temperature of the core and storing the estimated temperature in a thermal storage area for the first core. By use of this estimated temperature, an appropriate voltage at which to operate the core when it exits the low power state can be determined. Other embodiments are described and claimed.

16 Claims, 6 Drawing Sheets

(56) References Cited

U.S. PATENT DOCUMENTS

| | | |
|---|---|---|
| 6,792,392 B1 | 9/2004 | Knight |
| 6,823,516 B1 | 11/2004 | Cooper |
| 6,829,713 B2 | 12/2004 | Cooper et al. |
| 6,908,227 B2 | 6/2005 | Fusu et al. |
| 6,983,389 B1 | 1/2006 | Filippo |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,146,514 B2 | 12/2006 | Kaushik et al. |
| 7,194,643 B2 | 3/2007 | Gonzalez et al. |
| 7,263,457 B2 | 8/2007 | White et al. |
| 7,272,730 B1 | 9/2007 | Acquaviva et al. |
| 7,412,615 B2 | 8/2008 | Yokota et al. |
| 7,434,073 B2 | 10/2008 | Magklis et al. |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,574,321 B2 * | 8/2009 | Kernahan et al. ............. 702/179 |
| 7,596,464 B2 | 9/2009 | Hermerding et al. |
| 7,603,577 B2 * | 10/2009 | Yamaji et al. ................. 713/323 |
| 7,624,215 B2 | 11/2009 | Axford et al. |
| 7,730,340 B2 | 6/2010 | Hu et al. |
| 7,752,467 B2 | 7/2010 | Tokue |
| 7,797,512 B1 | 9/2010 | Cheng et al. |
| 7,949,887 B2 | 5/2011 | Gunther et al. |
| 7,966,511 B2 | 6/2011 | Naveh et al. |
| 8,015,427 B2 | 9/2011 | Miller et al. |
| 8,370,551 B2 | 2/2013 | Ohmacht et al. |
| 8,407,319 B1 | 3/2013 | Chiu et al. |
| 8,601,288 B2 | 12/2013 | Brinks et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0030940 A1 | 2/2004 | Espinoza-Ibarra et al. |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0046400 A1 | 3/2005 | Rotem |
| 2005/0132238 A1 | 6/2005 | Nanja |
| 2005/0223258 A1 * | 10/2005 | Watts ............................ 713/322 |
| 2005/0288886 A1 | 12/2005 | Therien et al. |
| 2006/0006166 A1 | 1/2006 | Chen et al. |
| 2006/0041766 A1 | 2/2006 | Adachi |
| 2006/0050670 A1 | 3/2006 | Hillyard et al. |
| 2006/0053326 A1 | 3/2006 | Naveh et al. |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0033425 A1 | 2/2007 | Clark |
| 2007/0079294 A1 | 4/2007 | Knight |
| 2007/0101174 A1 | 5/2007 | Tsukimori et al. |
| 2007/0106428 A1 | 5/2007 | Omizo et al. |
| 2007/0106827 A1 | 5/2007 | Boatright et al. |
| 2007/0156992 A1 | 7/2007 | Jahagirdar |
| 2007/0168151 A1 | 7/2007 | Kernahan et al. |
| 2007/0214342 A1 | 9/2007 | Newburn |
| 2007/0234083 A1 | 10/2007 | Lee |
| 2007/0239398 A1 | 10/2007 | Song et al. |
| 2007/0245163 A1 | 10/2007 | Lu et al. |
| 2007/0260895 A1 | 11/2007 | Aguilar et al. |
| 2008/0005603 A1 | 1/2008 | Buch et al. |
| 2008/0028240 A1 | 1/2008 | Arai et al. |
| 2008/0028778 A1 * | 2/2008 | Millet ............................ 62/129 |
| 2008/0077282 A1 | 3/2008 | Hartman et al. |
| 2008/0077813 A1 | 3/2008 | Keller et al. |
| 2008/0104425 A1 | 5/2008 | Gunther et al. |
| 2008/0136397 A1 | 6/2008 | Gunther et al. |
| 2008/0250260 A1 | 10/2008 | Tomita |
| 2008/0307240 A1 | 12/2008 | Dahan et al. |
| 2009/0006871 A1 | 1/2009 | Liu et al. |
| 2009/0070605 A1 | 3/2009 | Nijhawan et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0235108 A1 | 9/2009 | Gold et al. |
| 2009/0271141 A1 * | 10/2009 | Coskun et al. ................ 702/132 |
| 2009/0271646 A1 | 10/2009 | Talwar et al. |
| 2009/0313489 A1 | 12/2009 | Gunther et al. |
| 2010/0058078 A1 | 3/2010 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2010/0250856 A1 | 9/2010 | Owen et al. |
| 2010/0332927 A1 | 12/2010 | Kurts et al. |
| 2011/0022865 A1 | 1/2011 | Gunther et al. |
| 2011/0072429 A1 | 3/2011 | Celeskey et al. |
| 2011/0093733 A1 | 4/2011 | Kruglick |
| 2011/0154090 A1 | 6/2011 | Dixon et al. |
| 2011/0191607 A1 | 8/2011 | Gunther et al. |
| 2011/0283124 A1 | 11/2011 | Branover et al. |
| 2012/0053897 A1 * | 3/2012 | Naffziger ...................... 702/182 |
| 2012/0066535 A1 | 3/2012 | Naffziger |
| 2012/0096288 A1 * | 4/2012 | Bates et al. ................... 713/320 |
| 2012/0110352 A1 | 5/2012 | Branover et al. |
| 2012/0114010 A1 | 5/2012 | Branch |
| 2012/0116599 A1 | 5/2012 | Arndt et al. |
| 2012/0173907 A1 | 7/2012 | Moses et al. |
| 2013/0061064 A1 | 3/2013 | Ananthakrishnan et al. |
| 2013/0080795 A1 | 3/2013 | Sistla et al. |
| 2013/0080804 A1 | 3/2013 | Ananthakrishan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0246825 A1 | 9/2013 | Shannon |

FOREIGN PATENT DOCUMENTS

| | | |
|---|---|---|
| CN | 101010655 | 5/2010 |
| EP | 1 282 030 A1 | 5/2003 |
| KR | 10-2006-012846 | 12/2006 |
| TW | I342498 | 5/2011 |
| TW | I344793 | 7/2011 |

OTHER PUBLICATIONS

SPEC-Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

(56) References Cited

OTHER PUBLICATIONS

Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
Intel Technology Journal, "Power and Thermal Management in the Intel Core Duo Processor," May 15, 2006, pp. 109-122.
David L. Hill, et al., "The Uncore: A Modular Approach to Feeding the High-Performance Cores," Intel Technology Journal, 2010, vol. 14, Issue 3, pp. 30-49.
Intel Developer Forum, IDF2010, Opher Kahn, et al., "Intel Next Generation Microarchitecture Codename Sandy Bridge: New Processor Innovations," Sep. 13, 2010, 58 pages.
U.S. Patent and Trademark Office, Office Action mailed Aug. 18, 2014, in U.S. Appl. No. 13/285,465.
U.S. Patent and Trademark Office, Final Office Action mailed May 14, 2014, with Request for Continued Examination filed Aug. 13, 2014, in U.S. Appl. No. 13/247,580.
U.S. Patent and Trademark Office, Office Action mailed Jun. 6, 2014, with Reply filed Sep. 4, 2014, in U.S. Appl. No. 13/282,947.
U.S. Patent and Trademark Office, Office Action mailed May 16, 2014, with Reply filed Aug. 12, 2014, in U.S. Appl. No. 13/285,414.

* cited by examiner

ESTIMATING TEMPERATURE OF A PROCESSOR CORE IN A LOW POWER STATE WITHOUT THERMAL SENSOR INFORMATION

BACKGROUND

Modern processors include significant amounts of circuitry and operate at ever increasing frequencies. The trend in processor design is towards multicore designs in which multiple independent processor cores are present on one or more semiconductor die of a processor package. By providing multiple processor cores, often of relatively simple design, workloads can be efficiently split up and executed in parallel on the different processors.

To provide power savings, when a given processor core is not being used, it can be placed into a low power state. When all processors of a given package are in a low power state, the package itself can be placed into a low power state in which deeper power savings are available, however this comes at the expense of greater latency in exiting from such low power state.

To maintain a measure of core temperature, one or more cores may have a thermal sensor associated with it. This temperature information is used in part to determine an appropriate frequency and voltage at which to operate the core. Such temperature information is used when a core wakes from a low power state to enable an appropriate voltage (and frequency) to be provided to the core. Stale temperature information obtained prior to the low power state may be unsuitable for determining an appropriate voltage at which to operate the core. Thus many processors maintain a thermal sensor powered on even when the corresponding core is in a low power state. However, this reduces the benefit of the low power state, and also prevents entry into certain deeper low power states.

DETAILED DESCRIPTION

In various embodiments, a temperature of a core of a multicore processor that is in a low power state can be estimated. By way of this estimation, determinations can be made as to appropriate voltages and/or frequencies at which to operate the core when it exits the low power state. As process technology evolves, in modern processors, the voltage used to operate processor circuits at a certain frequency is strongly dependent on the operating temperature. By estimating the temperature of a core even when it is powered down, circuit functionality can be guaranteed when the core is brought out of a low power state. That is, for devices fabricated in some semiconductor processes, a reverse temperature coefficient exists such that as the die cools, a higher voltage is needed to run at a given frequency. If an estimation such as made available in accordance with an embodiment of the present invention is not available, upon waking, a core may be assumed to be at a higher temperature than it actually is, and may be provided an insufficient voltage to run its circuitry, potentially leading to a speed path failure.

Furthermore, a scheduling algorithm that takes into account temperature information can make a scheduling decision based on this information. In addition, embodiments may further estimate the temperature of multiple cores of a multicore processor when these multiple cores are in a low power state. For example, two cores of a multicore processor both can be in a low power state and the temperature of each can be estimated. Still further, when all cores of a multicore processor are in a low power state (such as in a given package low power state), the temperature of all cores can be estimated.

Although the scope of the present invention is not limited in this regard, some embodiments may be implemented in logic of a power control unit (PCU) or other uncore or system agent circuitry of a multicore processor. Such PCU is a central control unit in the processor that receives temperature information from thermal sensors, estimates leakage and prescribes an operating voltage for the cores. In this way, temperature estimations can be made while one or more cores are in a low power state. In addition, one or more thermal sensors associated with these cores may also be in a low power state. As a result, greater power savings can be achieved by enabling both cores and their associated thermal sensors to be in a low power state. Nevertheless, valid temperature information can still be determined to enable appropriate scheduling, voltage, frequency and other decisions to be made.

Figure 1:
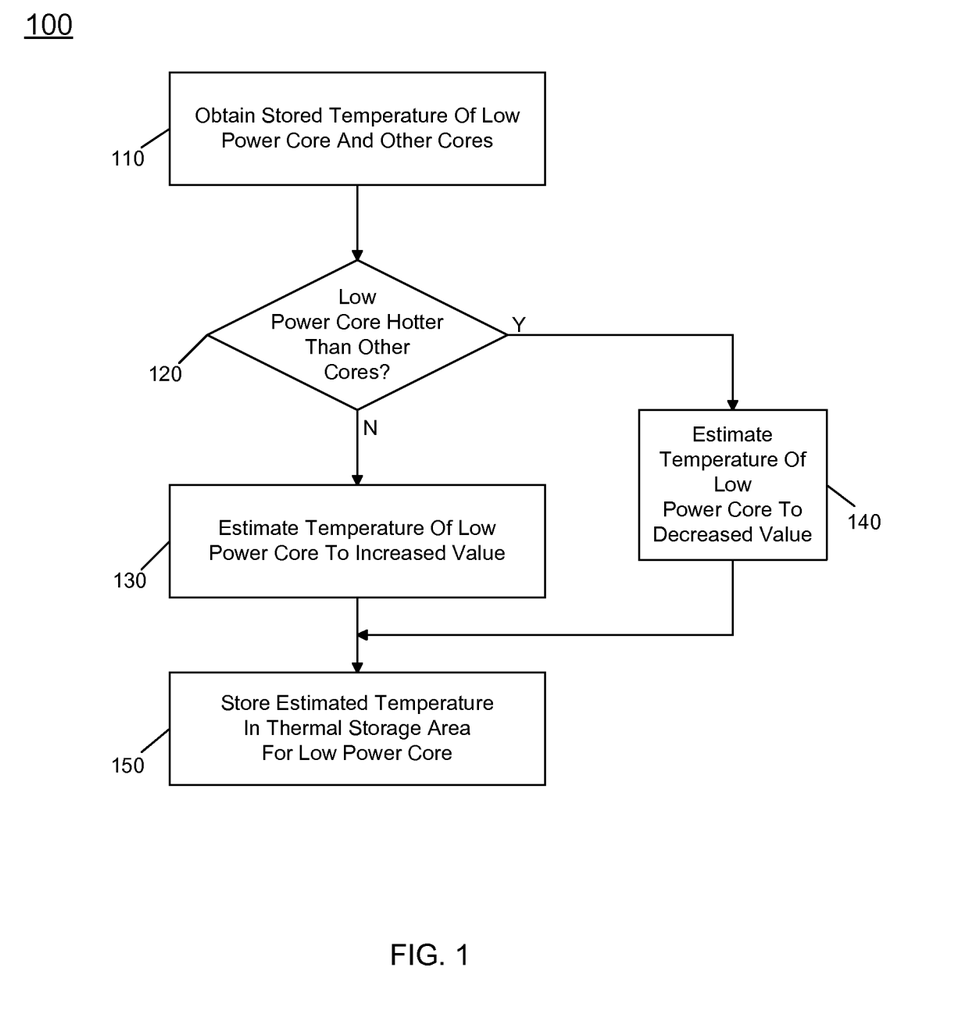
FIG. 1 is a flow diagram of a method in accordance with an embodiment of the present invention.

Referring to FIG. 1, shown is a flow diagram of a method in accordance with an embodiment of the present invention. In various embodiments, method 100 can be implemented using various processor hardware, firmware and/or software. For example, in one embodiment method 100 may be implemented using information received from the cores and/or thermal sensors, in addition to performing operations in a logic of a power control unit (PCU). When a core is in a low power state and its corresponding thermal sensor is also in a low power state, its temperature cannot be determined using thermal sensor data and accordingly an estimation is performed.

Method 100 thus can be performed by logic of a PCU when a temperature estimate is to be performed for a core. As seen, at block 110 a stored temperature of the core and all other cores can be obtained. Such information can be obtained from a thermal storage area associated with each core. This storage area can be an entry of a temperature memory, which can include entries for each core to store temperature and related information. Next at diamond 120 it can be determined whether the low power core is hotter than all other cores. If not, a temperature of the low power core can be estimated to an increased value (block 130). The temperature for the low power core can be estimated using a charging equation, as will be described further below. This occurs as the higher temperature of the other cores can cause the temperature of the low power core to also increase due to thermal coupling of the cores.

Otherwise if the low power core is hotter than all other cores, control passes to block 140 where a temperature of the low power core can be estimated to a decreased value. As an example, this decreased value can be estimated using a decay equation as will be discussed below. From both of blocks 130 and 140, control passes to block 150 where the estimated temperature can be stored in a thermal storage area associated with the low power core. Although described with this particular implementation in the embodiment of FIG. 1, understand the scope of the present invention is not limited in this regard.

Figure 2:
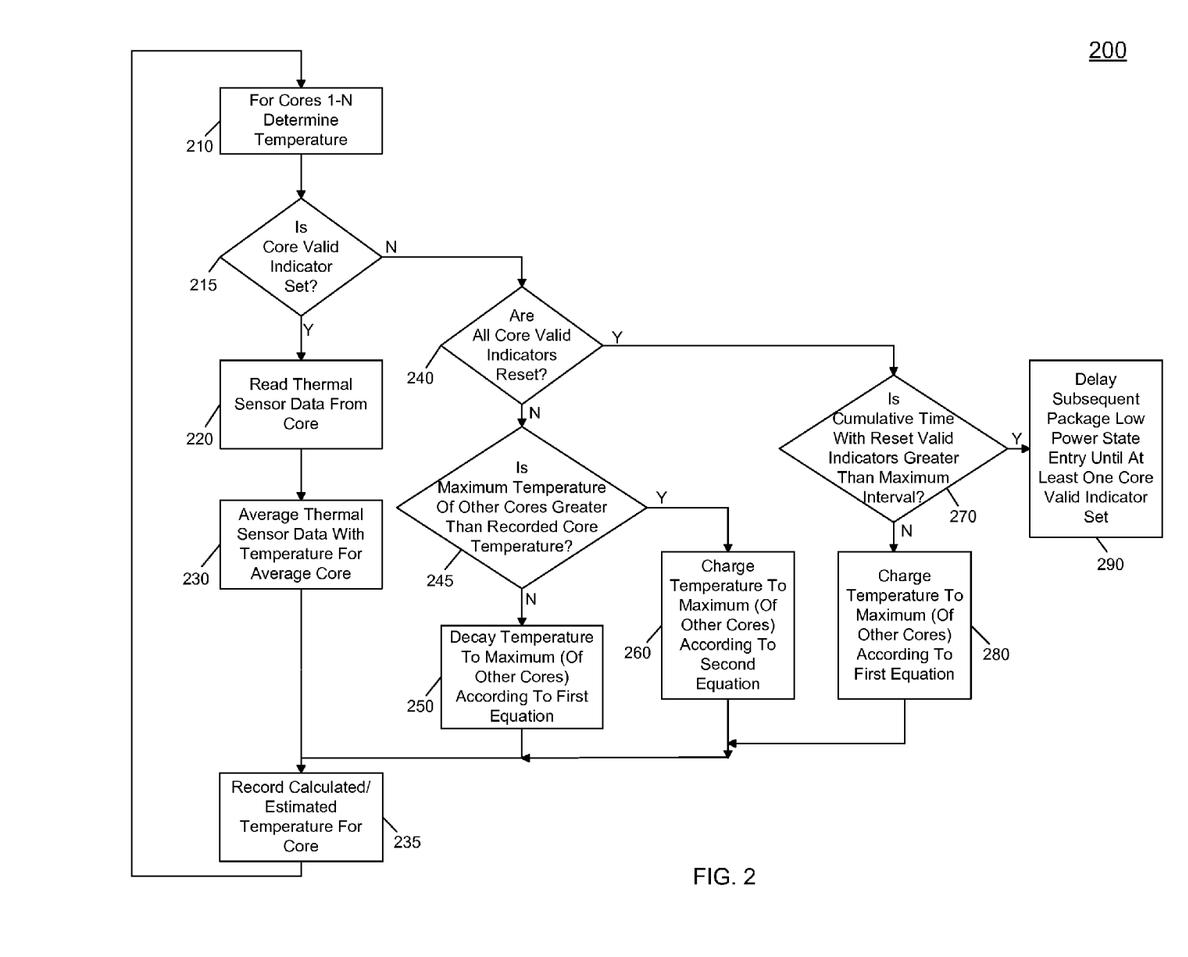
FIG. 2 is a flow diagram of operations performed in a temperature determination in accordance with an embodiment of the present invention.

Referring now to FIG. 2, shown is a more detailed flow diagram of a temperature determination in accordance with an embodiment of the present invention. This method can also be performed by PCU logic using thermal data. As seen, method 200 may be an iterative process that can be performed for each of N cores of a multicore processor (block 210). For each core of the processor, the various operations shown in FIG. 2 can be performed, e.g., at a predetermined interval. For example, in some embodiments during each predetermined interval of processor operation, the various operations can be performed for each core. Although the scope of the present invention is not limited in this regard, in one embodiment these operations can be performed iteratively for each core per millisecond (ms) of processor operation. Of course, other time intervals can be used in other embodiments.

As seen, the analysis for a given core can begin with a determination at diamond 215 as to whether a valid indicator for the core is set. This indicator may be used to indicate that a valid thermal sensor reading has been recently obtained for that core, namely that the core and corresponding thermal sensor are in an active state. In one embodiment, this valid indicator can be stored in the thermal storage area associated with the core, e.g., as a valid bit that is stored in an entry for this core along with temperature information, namely temperature data obtained from the thermal sensor and/or a calculated or estimated temperature generated by the logic. In another embodiment, the valid indicator may be a bit per thermal sensor (or core) that can be maintained in the PCU and used to track whether the thermal information coming from the sensor in a core is valid or not. If the thermal valid bit is cleared, the data coming from that particular sensor is not valid. If a valid indicator is present, control passes to block 220 where the thermal sensor data can be read from the entry for the core. This information may be obtained from a thermal sensor, which in one embodiment is coupled to the PCU via a dedicated interconnect, e.g., a push bus. In many implementations, each core can include at least one thermal sensor to measure core temperature and transmit this information, e.g., to the PCU. Each thermal sensor has a "scan time," which is the time it takes for the sensor to estimate temperature accurately from the time it is turned on. After this scan time, a thermal sensor can continuously feed temperature data to the PCU. In one embodiment, the push bus acts as an interface between the thermal sensor and the PCU through which the sensor communicates temperature information to the PCU. In one embodiment, the PCU periodically reads the push bus for temperature information, e.g., at an interval of every 128 microseconds ($\mu s$).

Control next passes to block 230 where a temperature of the core can be calculated based on this thermal sensor data and a stored temperature for this core, e.g., obtained from a thermal storage area associated with the core. Various manners of calculating a core temperature can be realized in different embodiments. In some implementations, the thermal sensor data obtained from the thermal sensor can be directly stored as the calculated temperature. In other embodiments, various calculations can be performed. For example, an averaging process can occur by averaging the thermal sensor data with a value stored in the thermal storage area, which in turn may be an average of previous readings of the thermal sensor data. Thus a moving average temperature can be maintained over the last N thermal sensor readings from each of the thermal sensor. The value of N can be configurable based on how much smoothing is desired and how much dithering there is in the thermal sensors themselves. In any event, control next passes to block 235 where this calculated/estimated temperature can be recorded for the core. As an example, this value can be stored in the thermal storage area associated with this core. As seen, control iterates back to block 210 for performing similar operations for a next core.

In general, the operations discussed above from block 210 through block 235 may be the ordinary processing path for determining core temperature when a core and associated thermal sensor are in an active state. In contrast, when a core is in a low power state (and its corresponding thermal sensor is also in a low power state), there will be no thermal sensor data received. Accordingly, method 200 may further provide for an estimation of a core temperature when the core and corresponding thermal sensor are in a low power state.

As seen in FIG. 2, control thus passes from diamond 215 to diamond 240 when it is determined that a valid indicator is not present for the core. This reset valid indicator thus indicates that the core is in a low power state and the corresponding thermal sensor is also in a low power state. At diamond 240, a determination can be been made as to whether all cores of the multicore processor have valid indicators that are reset. In other words, at diamond 240 it can be determined whether all cores are in a low power state such as a given package low power state. If not, control passes to diamond 245. There it can be determined whether the last recorded temperature for the current core (i.e., the core in a low power state) is less than a maximum temperature of all other cores of the multicore processor. If not, a temperature estimation for this low power core can be made at block 250. More specifically, at block 250 a temperature of the core can be estimated according to a first equation, namely a decay equation. This is so, as because the core is hotter than all other cores, its temperature will slowly decrease while the core remains in a low power state. Although the scope of the present invention is not limited in this regard, in one embodiment this first equation may cause a decay of the low power core's temperature to a maximum temperature of the other cores, e.g., at a decay rate of 1° Celsius (C.) per a given time interval, e.g., 10 ms. Of course, other decay equations can be used in other embodiments. As seen, control returns to block 235 where this estimated temperature can be recorded for this low power core.

Still referring to FIG. 2, if it is determined that the low power core has a lower temperature than at least one other core of the processor, control instead passes to block 260. There, a temperature estimate for the core can be calculated according to a second equation, namely a charging equation. Although the scope of the present invention is not limited in this regard, this second equation may cause an increase of the low power core's temperature to a maximum temperature of the other cores, e.g., at an increment rate of 1° C. per a given time interval, e.g., 1 ms.

As further shown in FIG. 2, if instead at diamond 240 it is determined that all cores have reset valid indicators, this means that the multicore processor is in a low power state such as a package low power state. Accordingly, control passes to diamond 270. There it can be determined whether a cumulative time that the processor has been in this low power state is less than a maximum invalid temperature interval. This maximum interval may correspond to the largest time duration for which it is acceptable to not obtain valid temperature information from at least one core of a processor, and can be between 1 and 50 ms, in one embodiment. That is, to avoid stale thermal information, a duration of time that the package is in an active package state can be maintained, e.g., in an accumulator. If the package has cumulatively over multiple active and low power package transitions been in a package low power state for longer than the maximum invalid temperature interval, the PCU can cause a delay into a subsequent package low power state until at least one core has been placed into an active state and a valid temperature reading has been obtained, at block 290. If this is not the case, control passes to block 280, where the temperature for the core can be determined according to a decay equation. In some embodiments, this decay equation may be the same as discussed in block 250 above.

By way of obtaining of this information via the low power state delay mechanism, further temperature estimations for cores in a low power state can be performed. Thus if all the cores in a processor are in a low power state, the thermal valid indicators are cleared and there is no reliable thermal information provided from the thermal sensors to the PCU. By the forced delay into a package low power state, a thermal runaway scenario can be avoided, which can occur when the package is rapidly transitioning into and out of a package C0 state and every individual package C0 duration is shorter than the scan time interval. This is so, since when every individual package C0 duration is shorter than the scan time interval, the PCU does not receive an updated thermal sensor reading and is either charging or decaying every core's temperature estimate. As a result, the last actual thermal reading from the sensor could have been sent to the PCU a long time ago and the actual die temperature could have drifted a long way away from the PCU estimate. Thus at block 290 to avoid this drift, the PCU delays entry into deep core or package C6 state until a valid thermal sensor reading from at least one of the cores is available, thereby allowing the PCU to catch up to actual die temperature. Although shown with this particular set of operations in the embodiment of FIG. 2, understand the scope of the present invention is not limited this regard.

Figure 3:
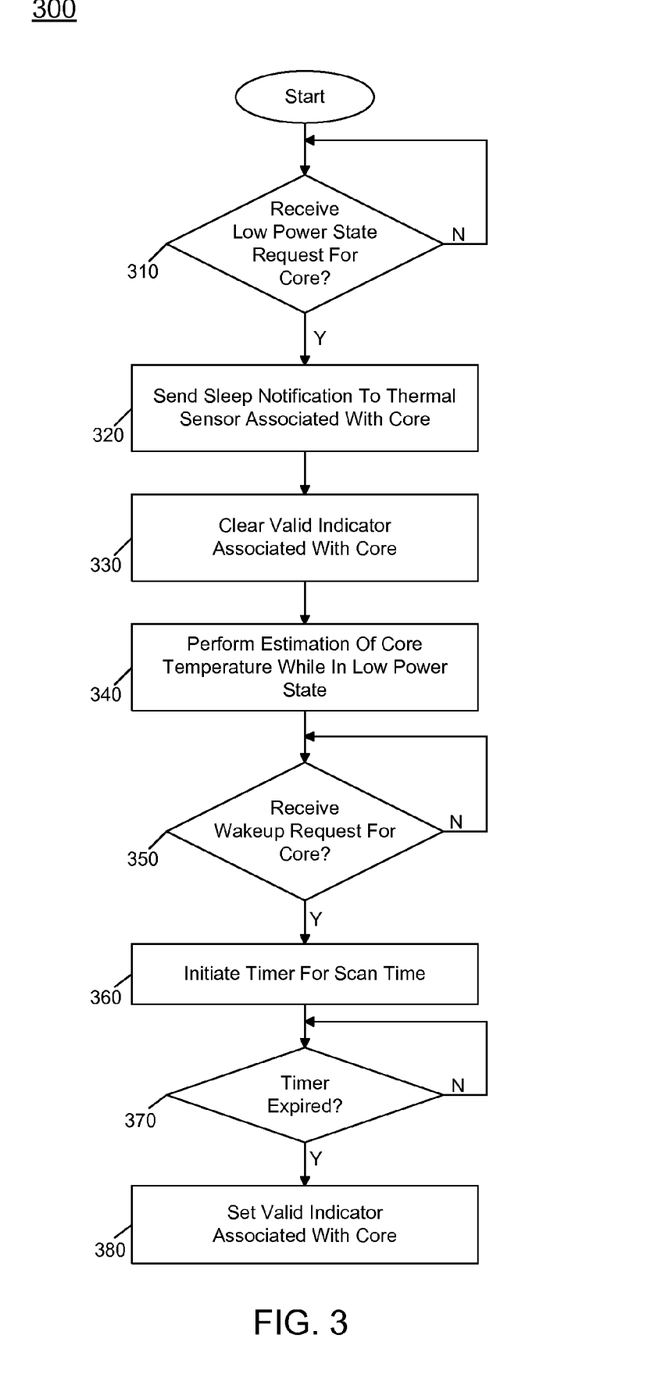
FIG. 3 is a flow diagram of a thermal estimation method in accordance with an embodiment of the present invention.

As seen above, to effect the various calculations, an analysis of whether a given core has a valid temperature reading is determined by way of valid indicators. Such valid indicators can be controlled by logic of the PCU. Referring now to FIG. 3, shown is a flow diagram of additional operations in temperature determinations in accordance with an embodiment of the present invention. As shown in FIG. 3, method 300, which also can be performed by PCU logic, can begin by determining whether a low power state request has been received for a given core (diamond 310). In various embodiments, this request can be received by the PCU, e.g., from the core directly, from an operating system (OS) scheduler or from another location. For example, when a core executes an instruction to request entry into a lower power state, e.g., via an MWAIT instruction to request entry into a C6-state, the PCU is notified and sends a sleep notification to the thermal sensor of the core requesting the C6 entry and powers down the thermal sensor and the core. Responsive to this request, a sleep notification can be sent from the PCU to both the core itself to trigger operations to cause entry into the low power state and to a thermal sensor associated with the core (block 320). As seen, control passes next to block 330 where a valid indicator associated with the core can be cleared. This valid indicator thus indicates that the corresponding core and thermal sensor are in a low power state. Accordingly, at block 340 rather than obtaining valid thermal sensor data from the thermal sensor, an estimation of the core temperature can be performed while the core is in a low power state. Different manners of performing this estimation can occur in different embodiments, as discussed above.

Still referring to FIG. 3, at diamond 350 it can be determined whether a wake-up request has been received for the core. As with the low power request, this request can be received from the core, an OS, or another scheduling mechanism. When such request is received, a timer can be initiated. More specifically at block 360, a timer can be initiated and set for a scan time for the thermal sensor. As described above, this scan time is the amount of time before the thermal sensor can output valid thermal sensor data after being re-enabled. Note that this scan time can be longer than the time a core remains in an active state. In this case the PCU does not receive any updated thermal sensor information from the core during this active state. Then it can be determined at diamond 370 whether this timer has expired. If so, control passes to block 380 where the valid indicator associated with the thermal sensor can be set. Thus FIG. 3 generally shows the operations performed in controlling a valid indicator in connection with entry into and exit from a low power mode.

Thus embodiments provide a means of tracking die temperature accurately without having to keep the thermal sensors always powered on. In this way, leakage current can be accurately estimated and an operating voltage set accurately when the cores seek entry into an active power state. At the same time, thermal sensors can be powered off when a corresponding core is in a low power state, thus minimizing the idle power of the processor.

Figure 4:
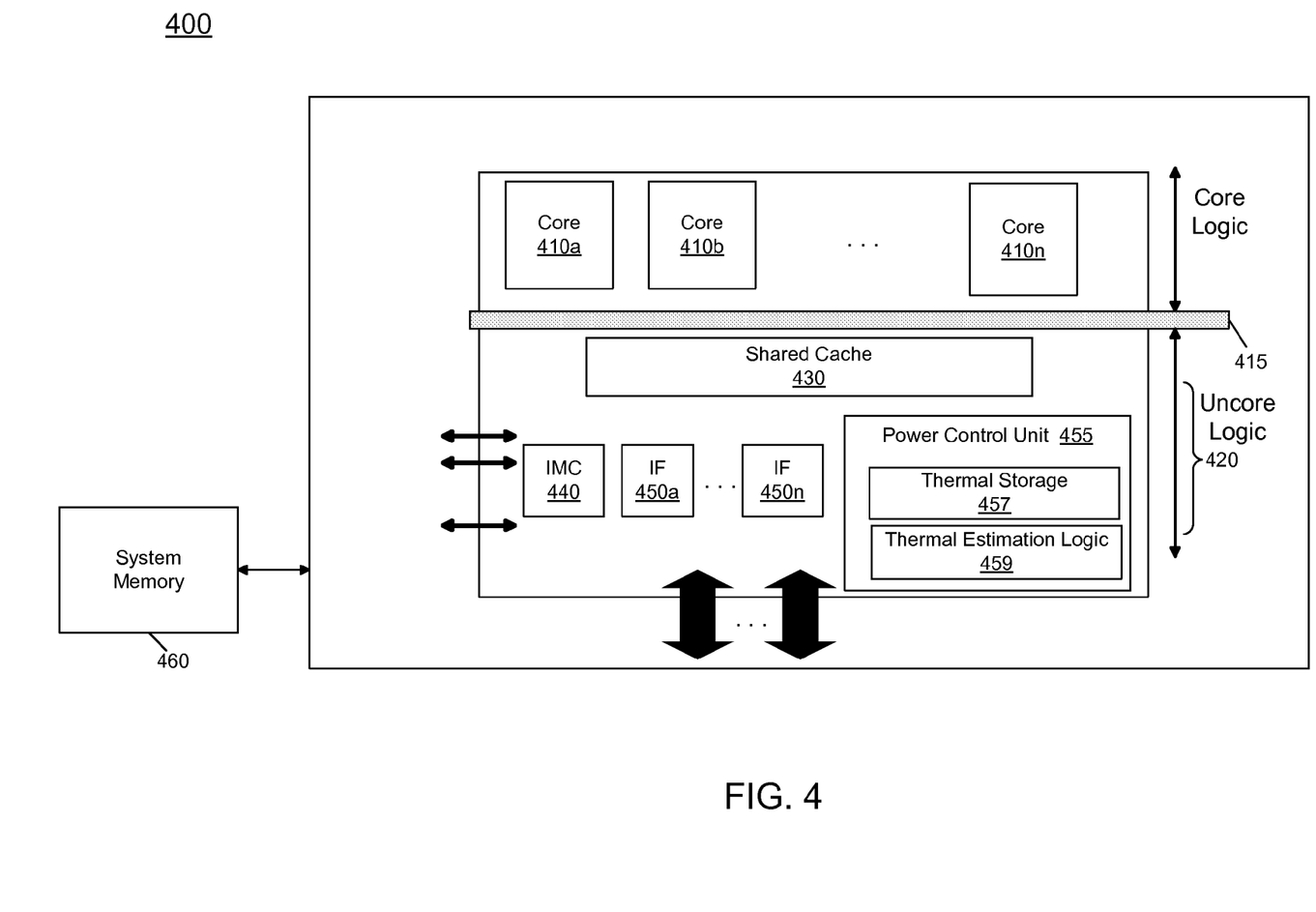
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including a plurality of cores $410_a$-$410_n$. In one embodiment, each such core may include a thermal sensor that can be controlled to be powered down when the core is powered down. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a thermal estimation logic 459, which may be a logic to perform thermal estimation of one or more cores that are in a low power state. In the embodiment of FIG. 4, logic 459 can estimate a temperature of a given core that is in a low power state. Furthermore, as discussed above, when the processor is in a package low power state, the logic can perform estimations for all the cores, assuming valid temperature information is available for at least one core. Otherwise, logic 459 may request PCU 455 to prevent a next entry into a package low power state until valid thermal data has been obtained from at least one thermal sensor. As further seen in FIG. 4, a thermal storage 457 may further be present within PCU 355 to store a temperature of each of the cores, along with corresponding valid indicators. Note that this thermal information can be used by PCU 455 for various operations with regard to power management and so forth. For example, PCU 455 can use the temperature information to determine a correct voltage to provide to the core upon exit from the low power state. Using the estimated temperature, this voltage can be calculated to be sufficient to enable the core to handle all processing tasks, including those that involve a speed path of the core. That is, the voltage determined can be higher than what would be calculated using stale temperature data from prior to the core's entry into the low power state. And, in many situations this voltage is higher than the voltage that the core was provided in its previous active state. Still further, thermal information from this storage can be used to perform workload scheduling to the cores.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
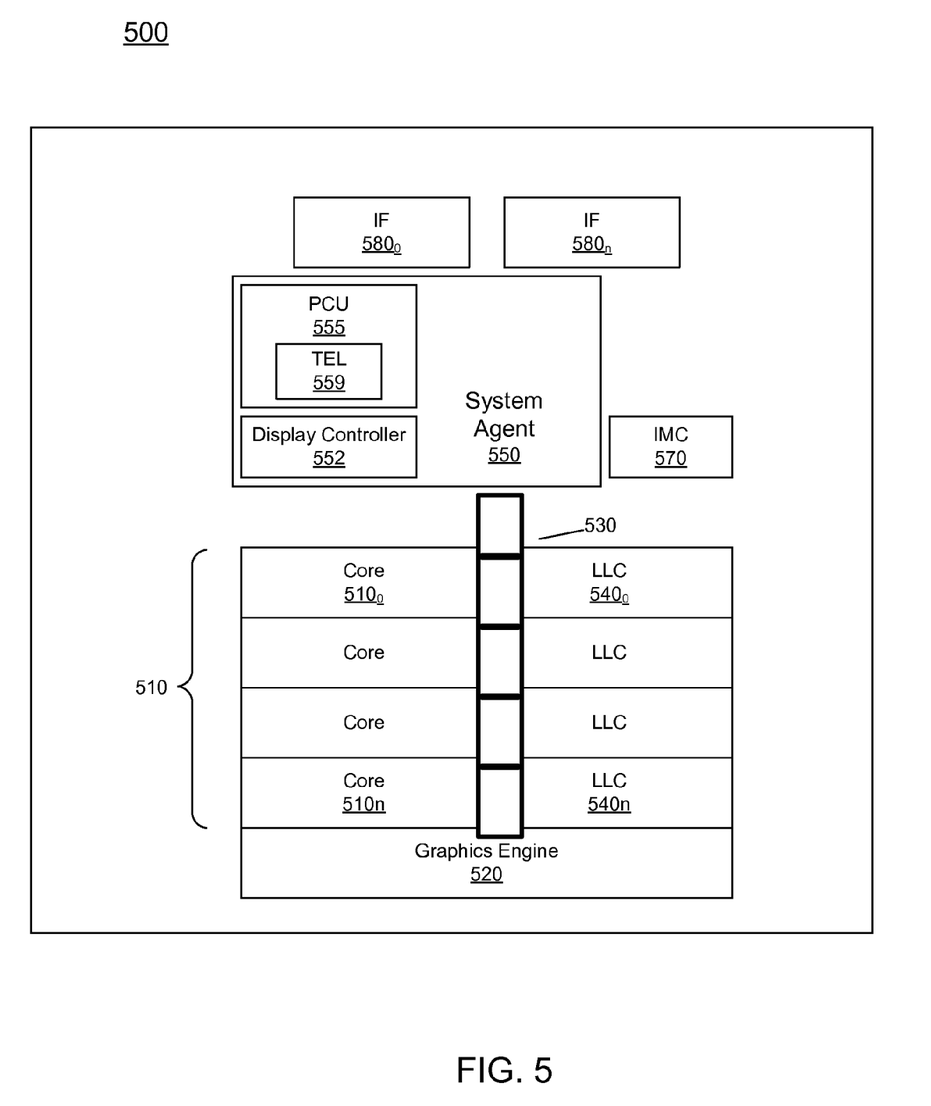
FIG. 5 is a block diagram of a multi-domain processor in accordance with another embodiment of the present invention.

Referring now to FIG. 5, shown is a block diagram of a multi-domain processor in accordance with another embodiment of the present invention of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. In various embodiments, system agent domain 550 may execute at a fixed frequency and may remain powered on at all times to handle power control events and power management such that domains 510 and 520 can be controlled to dynamically enter into and exit low power states. Each of domains 510 and 520 may operate at different voltage and/or power, and can provide independent thermal information to system agent domain 550, either at a domain level or an individual unit (e.g., core) level.

Note that while only shown with three domains, understand the scope of the present invention is not limited in this regard and additional domains can be present in other embodiments. For example, multiple core domains may be present each including at least one core. In this way, finer grained control of the amount of processor cores that can be executing at a given frequency can be realized.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 550 may be shared amongst the cores and the graphics engine, as well as various media processing circuitry. As seen, a ring interconnect 530 thus couples the cores together, and provides interconnection between the cores, graphics domain 520 and system agent circuitry 550.

In the embodiment of FIG. 5, system agent domain 550 may include display controller 552 which may provide control of and an interface to an associated display. As further seen, system agent domain 550 may include a power control unit 555 which can include a thermal estimation logic 559 in accordance with an embodiment of the present invention. In various embodiments, this logic may execute algorithms such as shown in FIGS. 1-3 to thus maintain valid thermal information for one or more cores that may be in a given low power state.

As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 5, understand the scope of the present invention is not limited in this regard.

Figure 6:
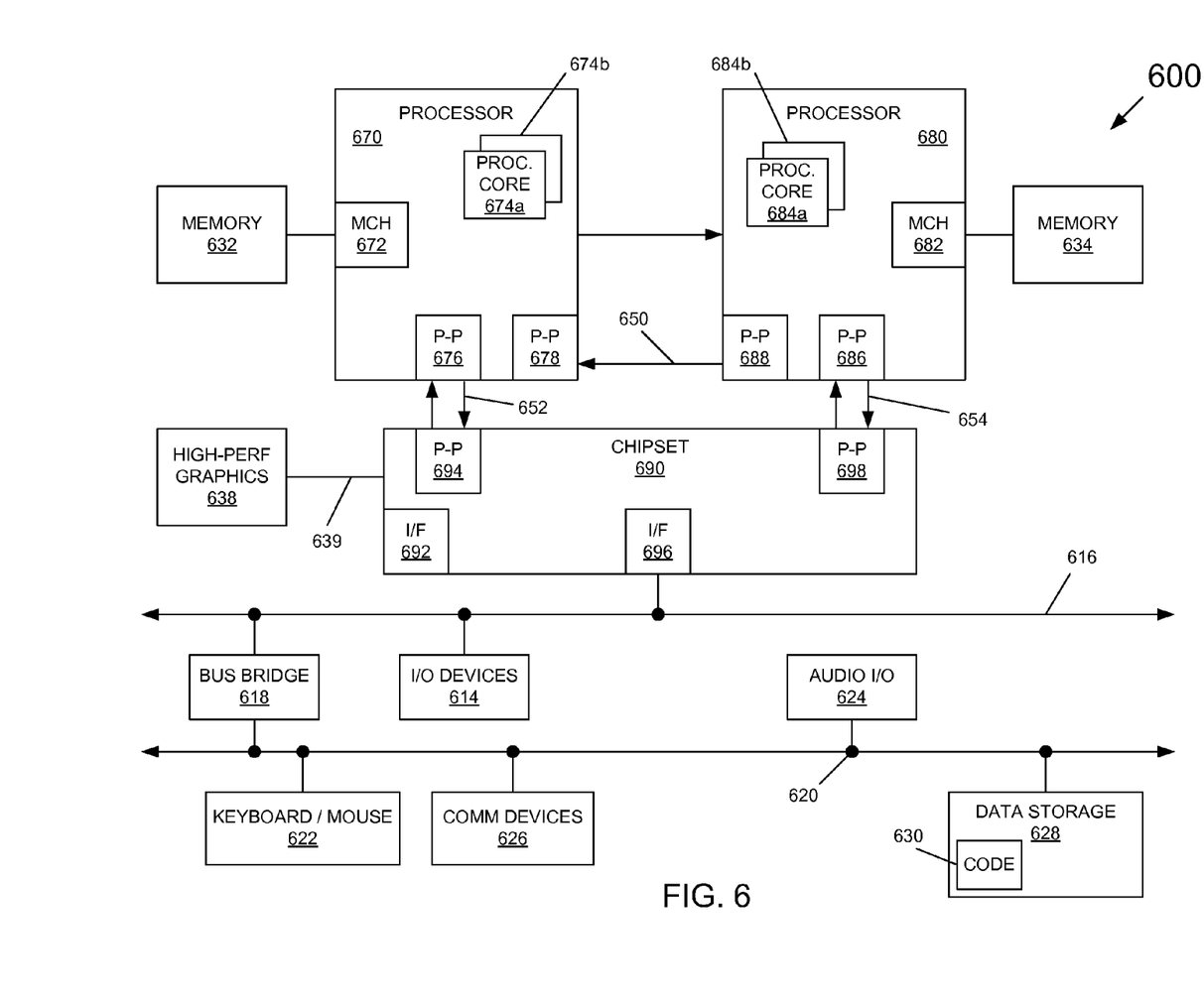
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform thermal estimations of cores in low power states, as described herein.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores;
   a plurality of thermal sensors each associated with one of the plurality of cores; and
   a power control unit (PCU) coupled to the plurality of cores, the PCU including a first logic to estimate a temperature of a first core of the plurality of cores for a current time at the current time while the first core and a first thermal sensor associated with the first core are in a low power state, without thermal sensor data from the first thermal sensor, and to prevent the first core in an active state from entry into the low power state until valid temperature data from the first thermal sensor is obtained and stored in a thermal sensor area for the first core.

2. The processor of claim 1, wherein the first logic is to estimate a temperature of the plurality of cores while the processor is in a package low power state.

3. The processor of claim 1, wherein the first thermal sensor associated with the first core is to be powered down when the first core is in the low power state.

4. The processor of claim 3, wherein the first logic is to receive a temperature of the first core from the first thermal sensor at a prior time when the first core is in an active state.

5. The processor of claim 4, wherein the first logic is to store the temperature in the thermal sensor area for the first core, the thermal sensor area further including a valid indicator to indicate that the stored temperature is valid.

6. The processor of claim 5, wherein the first logic is to clear the valid indicator when the first core enters into the low power state.

7. The processor of claim 6, wherein the first logic is to set the valid indicator after a scan time period after the first core enters the active state.

8. A method comprising:
   determining if a first core of a multicore processor is in a low power state;
   if so, estimating a temperature of the first core at a current time without thermal sensor data obtained from a thermal sensor associated with the first core while the first core is in the low power state and storing the estimated temperature in a thermal storage area for the first core;
   otherwise calculating the temperature of the first core at the current time based on the thermal sensor data obtained from the thermal sensor associated with the first core and a stored temperature from the thermal storage area for the first core and storing the calculated temperature in the thermal storage area;
   determining that the multicore processor is in a package low power state, and determining whether a duration of the package low power state exceeds a maximum invalid temperature interval; and
   if the duration exceeds the maximum invalid temperature interval, preventing the multicore processor from entering into a subsequent package low power state until at least one valid indicator associated with a core of the multicore processor is active.

9. The method of claim 8, further comprising estimating the temperature of the first core while the first core is in the low power state and the thermal sensor associated with the first core is in a low power state.

10. The method of claim 8, further comprising estimating the temperature based on a stored temperature of the first core and a temperature of at least one other core of the plurality of cores.

11. The method of claim 10, further comprising if the stored temperature of the first core is higher than a maximum stored temperature of the other cores of the multicore processor, estimating the temperature of the first core to a lesser value than the stored temperature of the first core.

12. The method of claim 11, further comprising otherwise estimating the temperature of the first core to a higher value than the stored temperature of the first core.

13. The method of claim 8, further comprising initiating a timer for a scan time of the thermal sensor associated with the first core after the first core exits the low power state and setting a valid indicator associated with the first core after the timer expires.

14. A system comprising:
   a multicore processor including a plurality of cores, each of the plurality of cores including a thermal sensor, and a power controller coupled to the thermal sensor of each of the plurality of cores, wherein the power controller is to estimate a temperature of a first core of the plurality of cores at a current time when the first core and the corresponding thermal sensor are in a low power state, based at least in part on a temperature of at least one other core of the plurality of cores, according to a decay equation if a stored temperature of the first core is greater than a maximum stored temperature of other cores of the multicore processor and according to a charging equation if the stored temperature is less than the maximum stored temperature of the other cores of the multicore processor, wherein the power controller is to determine, using the temperature estimate, a voltage to provide to the first core upon exit from the low power state, wherein the voltage is higher than a prior voltage provided to the first core prior to entry into the low power state.

15. The system of claim 14, wherein the power controller is to prevent a core of the plurality of cores in an active state from entry into a low power state until valid temperature data from a thermal sensor associated with the core is obtained and stored in a thermal sensor area for the core.

16. The system of claim 15, wherein the power controller is to prevent the multicore processor from entry into a next package low power state until the valid temperature data is obtained and stored.

* * * * *